(12) United States Patent
Burns et al.

(10) Patent No.: US 6,858,067 B2
(45) Date of Patent: Feb. 22, 2005

(54) FILTRATION VESSEL AND METHOD FOR ROTARY GAS COMPRESSOR SYSTEM

(75) Inventors: David J. Burns, Mineral Wells, TX (US); John A. Krogue, Mineral Wells, TX (US); Tomas I. Borjon, Millsap, TX (US)

(73) Assignee: Perry Equipment Corporation, Mineral Wells, TX (US)

( * ) Notice: Subject to any disclaimer, the term of this patent is extended or adjusted under 35 U.S.C. 154(b) by 92 days.

(21) Appl. No.: 10/293,777

(22) Filed: Nov. 12, 2002

(65) Prior Publication Data

US 2004/0089153 A1 May 13, 2004

(51) Int. Cl.$^7$ ............................................. B01D 50/00
(52) U.S. Cl. ..................... 95/268; 55/337; 55/DIG. 17; 415/169.2; 418/89
(58) Field of Search ........................... 55/337, DIG. 17; 95/268; 415/169.2; 418/89; 417/53, 52, 228, 313

(56) References Cited

U.S. PATENT DOCUMENTS

| | | | | |
|---|---|---|---|---|
| 2,095,586 A | * | 10/1937 | Algard | 55/330 |
| 2,402,140 A | * | 6/1946 | Heintzelman | 55/482 |
| 2,511,967 A | * | 6/1950 | Campbell | 55/333 |
| 2,547,769 A | * | 4/1951 | Packie et al. | 55/337 |
| 2,692,655 A | * | 10/1954 | Peeps | 55/457 |
| 3,364,658 A | * | 1/1968 | Walker | 55/309 |
| 3,870,493 A | * | 3/1975 | Kall et al. | 55/391 |
| 3,917,474 A | * | 11/1975 | Heckenkamp et al. | 96/189 |
| 3,934,990 A | * | 1/1976 | Ide, III | 96/408 |
| 4,092,137 A | * | 5/1978 | Howe et al. | 96/190 |
| 4,162,904 A | * | 7/1979 | Clay et al. | 96/381 |
| 4,506,523 A | * | 3/1985 | DiCarlo et al. | 62/470 |
| 4,690,759 A | * | 9/1987 | Mandy | 210/304 |
| 4,872,890 A | * | 10/1989 | Lamprecht et al. | 55/323 |
| 4,906,264 A | * | 3/1990 | Szymaszek et al. | 55/324 |
| 5,053,126 A | * | 10/1991 | Krasnoff | 210/188 |
| 5,170,640 A | * | 12/1992 | Heitmann et al. | 62/470 |
| 5,599,365 A | * | 2/1997 | Alday et al. | 55/426 |
| 5,827,430 A | | 10/1998 | Perry, Jr. et al. | 201/497.01 |
| 6,010,320 A | | 1/2000 | Kwon | 418/85 |
| 6,136,076 A | * | 10/2000 | Read | 96/189 |
| 6,149,408 A | | 11/2000 | Holt | 418/1 |
| 6,168,647 B1 | | 1/2001 | Perry, Jr. et al. | 95/19 |
| 6,206,953 B1 | * | 3/2001 | Bangs | 95/268 |
| 6,416,302 B1 | | 7/2002 | Achtelik et al. | 418/201 |
| 6,485,535 B1 | * | 11/2002 | Linnersten et al. | 55/319 |
| 6,500,243 B2 | * | 12/2002 | Cook et al. | 96/189 |
| 6,585,790 B2 | * | 7/2003 | Linnersten et al. | 55/319 |

\* cited by examiner

*Primary Examiner*—Duane S. Smith
(74) *Attorney, Agent, or Firm*—Charles D. Gunter, Jr.

(57) ABSTRACT

A filtration vessel is shown for use with a rotary screw compressor which receives a compressed liquid/gas mixture from the compressor. The vessel utilizes a first stage vortex knockout region to remove bulk liquids through a circular motion which imposes centrifugal forces on the gas and liquid mixture. A coalescer region located above the vortex knockout region receives the relatively lighter fluids and separates any remaining entrained liquids from the fluids. The discharge from the filtration unit is an essentially liquid free compressed gas. The liquid discharge, in the case of lube oil can be recirculated to the compressor for another cycle.

16 Claims, 4 Drawing Sheets

FILTRATION VESSEL AND METHOD FOR ROTARY GAS COMPRESSOR SYSTEM

BACKGROUND OF THE INVENTION

1. Field of the Invention

The present invention relates to a device and method for separating oil in a rotary compressor system and, specifically, to a filtration vessel which acts as a lube oil separation coalescer to eliminate liquid particles from a gas stream utilizing a rotary screw compressor.

2. Description of the Prior Art

Helical lobe rotary compressors, commonly referred to as "screw compressors" are becoming more and more popular in the air compressor, refrigeration and natural gas processing industries. These screw type processors utilize rotors or screws to push or compress gas to a higher pressure. Commonly, two cylindrical rotors are mounted on separate shafts inside a hollow, double-barreled casing. The sidewalls of the compressor casing form two parallel, overlapping cylinders which house the rotors in side by side fashion with their shafts generally parallel to the ground. Helically extending lobes and grooves on the exterior surface of the rotors mesh with one another during operation to form a series of chevron-shaped gaps between the rotors. These gaps form a continuous compression chamber that communicates with the compressor gas inlet with the gaps being continuously reduced in volume as the rotors turn in order to compress the gas toward a discharge port at the opposite end of the casing. The screw compressor rotors intermesh within the housing and rotate in opposite directions in synchronization. As a result, gas is swept through the housing from the intake manifold at one end of the housing to an output manifold at the opposite end.

The rotor shafts are typically supported at either end of the casing by lubricated bearings or seals that receive a constant supply of lubricant from a lubricant circulation system. The lubricants are typically oil-based liquids, commonly referred to as "lube oils" in the industry. These oils are typically "synthetic" oils which are more expensive than typical engine motor oils. The screw compressors of the type under consideration also include a means for recirculating the lube oil through the inside of the compressor casing. The injection of Tube oil directly in to the gas stream helps to cool and lubricate the rotors, blocks gas leakage between and around the rotors, inhibits corrosion and minimizes the screw compressor noise level.

As a result of the lubrication system utilized, a typical oil flooded screw compressor discharges a high pressure and high temperature stream which is a mixture of the lube oil and compressed gas. The oil and any other liquid or solid contaminants must be separated from the high pressure gas stream. This particular application is challenging due to the large concentration of lube oil as free liquid and aerosols in the fluid stream. Standard gas coalescers handle a relatively small amount of liquid whereas screw compressor lube oil separation coalescers can be designed to handle lube oil rates of up to 200 GPM. Most of the prior art designs have relied upon gravity separation in the inlet or storage sections of the filtration vessel and have utilized standard gas industry coalescer elements for the second stage, aerosol and mist removal section of the vessel.

It is important that the lube oil separation coalescer be very efficient at removing lube oil. Excessive continual loss of lube oil becomes a costly maintenance item as most screw compressors utilize expensive synthetic oils. The synthetic lube oils also build up in the natural gas pipeline to form a difficult to remove contaminant that commonly causes fouling of natural gas processing equipment.

SUMMARY OF THE INVENTION

The present filtration vessel and method are directed toward a process for filtering and coalescing liquid and oil particles in order to provide a cleaner, liquid free stream from screw compressor systems of the type under consideration.

The filtration vessel of the invention is used with a rotary screw compressor for receiving a compressed liquid/gas mixture discharged from the compressor and for creating an essentially liquid free gaseous discharge stream. The filtration vessel of the invention is installed downstream of the compressor to reclaim or catch lube oil and to coalesce and remove lube oil aerosols generated from the shear forces produced in the compressor. Once the lube oil is caught it is stored in a sump within the filtration vessel for a short time and is then pumped back into the compressor for another cycle. The vessel includes a vertically arranged vessel housing having an inlet. A vortex knockout region is located within a lower region of the vessel housing and communicates with the vessel inlet. The vortex knockout region utilizes uniform circular motion to impose a centrifugal force on gas and liquid fluids entering the vessel housing. The centrifugal force acts to separate relatively heavier fluids from relatively lighter fluids. A vertically arranged down-comer pipe is centrally located within the vessel housing. A coalescer region is located above the vortex knockout region within the vessel housing and contains a plurality of coalescer filter elements. The coalescer element region communicates with the vortex knockout region by means of the down-comer pipe for receiving the relatively lighter fluids separated in the vortex knockout region and for separating any entrained liquids remaining in the fluids. An outlet from the vessel housing receives and discharges the filtered fluids.

Preferably, the vessel housing has generally cylindrical interior sidewalls. The down-comer pipe has a generally cylindrical exterior and is located generally along a vertical center line of the vessel housing. The cylindrical sidewalls of the vessel housing and the exterior of the down-comer pipe serve to create the centrifugal force which is exerted on fluids entering the vessel housing. The preferred down-comer pipe has a stepped design which facilitates separation of bulk liquid from gas in the fluids entering the vessel housing.

The preferred coalescer filter elements each comprise a porous media, each element being housed within a rigid, vertical housing. Each rigid vertical housing is preferably a metal cylinder having a length and an internal diameter for receiving the porous coalescer element. The metal cylinders have louvered holes along the entire lengths thereof, whereby each coalescer element housing acts as a gas flow conditioner by stabilizing the gas flow around the coalescer element contained therein. The louvered holes provided along the length of each coalescer element housing provide a slight back pressure on the fluid exiting the coalescer elements, thereby resulting in a more uniform gas flow.

A process is also shown for the compression of fluids in which a low pressure gas stream is received into a rotary screw compressor. The low pressure gas stream is compressed within the rotary screw compressor while lubricating the compressor with a lube oil to thereby create a compressed gas/oil mixture. The gas/oil mixture is separated by first dropping out bulk liquids in a first filtration step conducted in a filtration vessel which utilizes a vortex knockout means utilizing uniform circular motion to impose a centrifugal force on the gas/oil mixture entering the vessel. The centrifugal force acts to separate relatively heavier lube oil from relatively lighter gas constituents of the mixture to produce a compressed gas having entrained liquids. Thereafter, the compressed gas having the entrained liquids is subjected to a second filtration step in the same filtration vessel by passing the compressed gas through a plurality of coalescing filter elements. The separated lube oil is recirculated back to the rotary screw compressor while the filtered compressed gas is discharged in a second stream from the filtration vessel.

A compressor system is also shown for use with fluid flows to create essentially liquid-free flows.

The system comprises a rotary screw compressor including
(a) an inlet port for receiving a low pressure gas stream;
(b) a main lubrication injection port for receiving a lube oil;
(c) a prime mover for powering the rotary screw compressor; and
(d) a discharge port for discharging a high pressure compressed gas/oil mixture from the compressor.

A filtration vessel is provided for receiving the gas/oil mixture from the compressor as previously described. The separated lube oil which is separated by the compressor is conducted back to the main lubrication injection port of the compressor while filtered compressed gas is discharged from the vessel.

In another embodiment of the compressor system, a filtration vessel of the type described can also be located upstream of the rotary screw compressor to filter gas on the suction side of the compressor. Like the filtration vessel used on the compressor discharge, the suction side filtration unit also has a first stage knockout vortex region and a second stage coalescer filter element region.

This arrangement would typically be used where the inlet stream to the compressor has or potentially has a very high liquid loading. In such an arrangement, the upstream filtration vessel would keep the screw compressor clean with the downstream filtration vessel being used to remove the lube oil from the gaseous compressor discharge.

Additional objects, features and advantages will be apparent in the written description which follows.

DETAILED DESCRIPTION OF THE INVENTION

Figure 1:
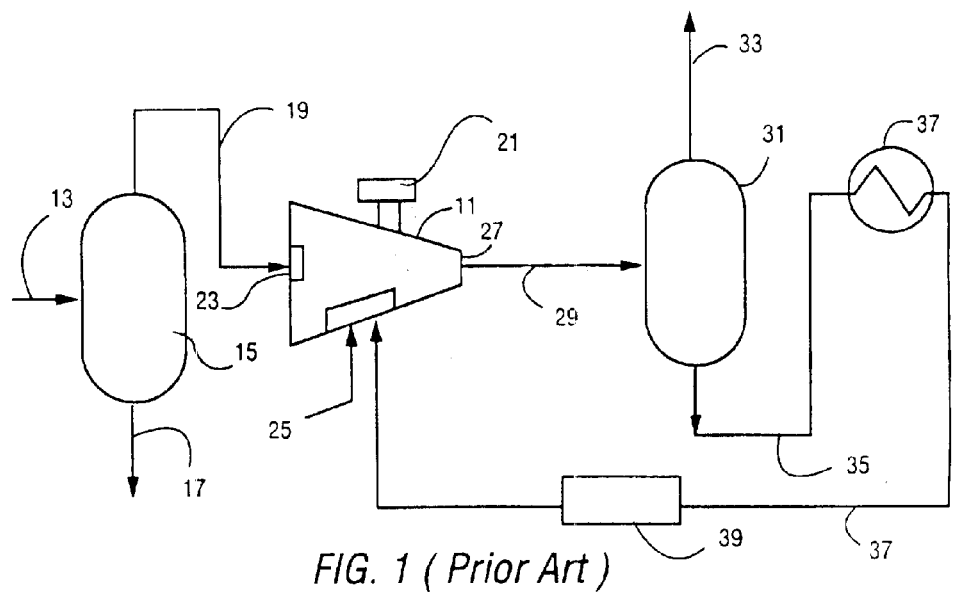
FIG. 1 is a simplified schematic diagram of a screw compressor system of the type in which the filtration vessel of the invention has utility.

FIG. 1 shows, in simplified schematic fashion, a prior art gas compression process and compressor system utilizing a rotary screw gas compressor 11. The compressor 11 is a conventional oil flooded rotary screw compressor as will be familiar to those skilled in the industry.

A raw gas feed stream 13 from a natural gas well or other source is supplied to a scrubber 15 for separating fluids and entrained solids from the raw gas stream 13. The scrubber 15 may be any conventional two or three phase separator which discharges a liquid stream 17 to a disposal reservoir and an essentially dry, low pressure gas stream 19 to the compressor 11. A portion of the gas stream may also be used to power the prime mover 21 which is used to power the compressor 11. However, a variety of other types of engines or electric motors may also be used to drive the compressor 11.

The compressor 11 receives the low pressure gas through an inlet port 23. A suitable lubricant is supplied to the inside of the casing of the compressor 11 through a main oil injection port 25 where it is mixed with the gas to form a low pressure gas/oil mixture. The low pressure gas/oil mixture is compressed and discharged from the compressor 11 through a discharge port 27 into a high pressure gas/oil mixture stream 29. A separator/filtration vessel 31 receives the high pressure gas stream 29 and separates the stream into a discharge gas stream 33 and a lube oil gas discharge stream 35. A siphon line 40 communicates the separator/filtration vessel with the gas stream in the conduit 19. The discharge gas stream 33 continues on for further processing and/or distribution to customers. The high temperature oil stream 35 typically passes to a lube oil cooler 37 or the lube oil may simply collect in the bottom of the vessel 31. The oil is preferably cooled in the range of about 120 to 200° F. and is then recirculated through the return conduit 37 and filter unit 39 to the appropriate entry point for lubricating the seals, bearings and screws of the compressor 11.

Figure 6:
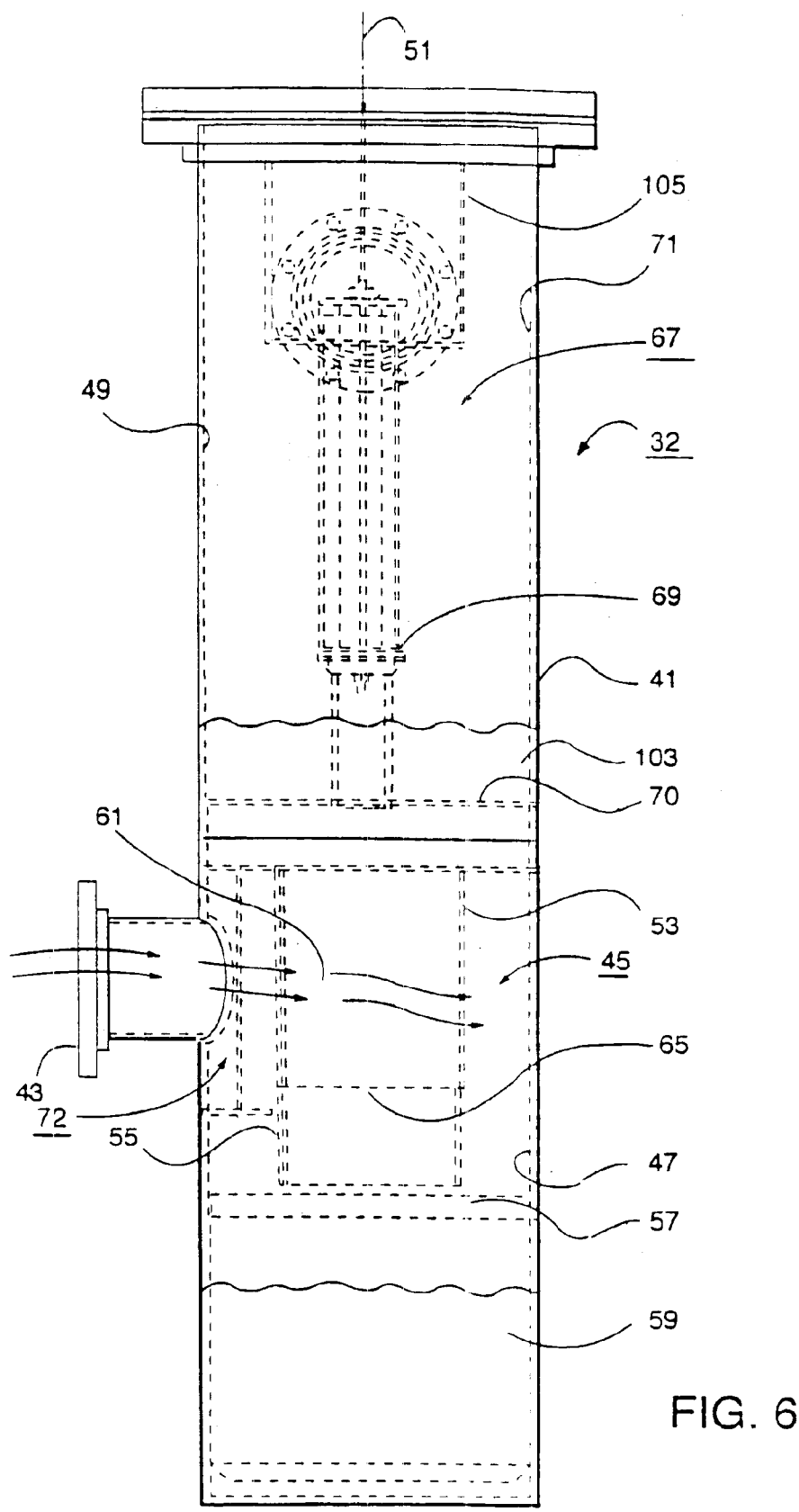
FIG. 6 is a left hand side, cross sectional view of the filtration vessel of the invention.

FIG. 6 is a side, cross-sectional view of the filtration vessel 32 of the invention which would be used in place of the conventional vessel 31 described above. The vessel 32 includes a vertically arranged vessel housing 41 having an inlet 43. A vortex knockout region 45 is located within a lower region 47 of the vessel housing and communicates with the vessel inlet 43. As can be seen in FIG. 6, the vessel housing 41 has generally cylindrical interior sidewalls 49 and has a vertical center line 51. A vertically arranged down-corner pipe 53 includes a cylindrical body region which is located generally along the vertical center line 51 of the vessel housing. As will be apparent from the arrows (generally at 61 in FIG. 6) representing the gas flow through the inlet 43, the cylindrical sidewalls 49 of the vessel housing 41 and the exterior surface 55 of the down-corner pipe 53 serve to create a centrifugal force which is exerted on the gas/oil mixture entering the vessel housing through the inlet 43. Flow baffles (72 in FIG. 6) are attached to the down-corner pipe 53 and the cylindrical interior sidewalls 49 and are designed to impart circular motion to the gas/liquid mixture. This causes the lube oil present in the incoming gases to be effected by centrifugal forces, forcing the heavier oil constituents to travel in a helical downward direction through the stilling screen 57 and into the reservoir 59. The stilling screen 57 located below the vortex knockout device works to divert gas flow up and away from the stored liquids. The lube oil in the reservoir 59 can be pumped from the reservoir back to the compressor when needed for another lubrication cycle.

Figure 2:
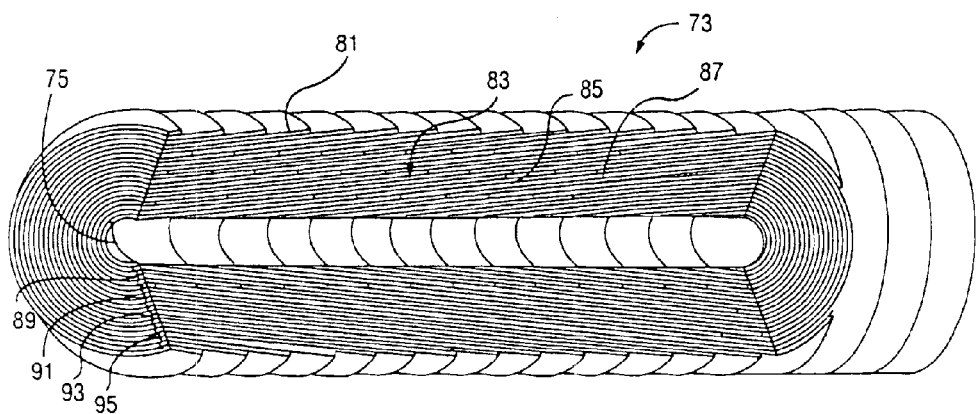
FIG. 2 is an isolated view of one of the filter elements used in the filtration vessel of the invention.
Figure 4:
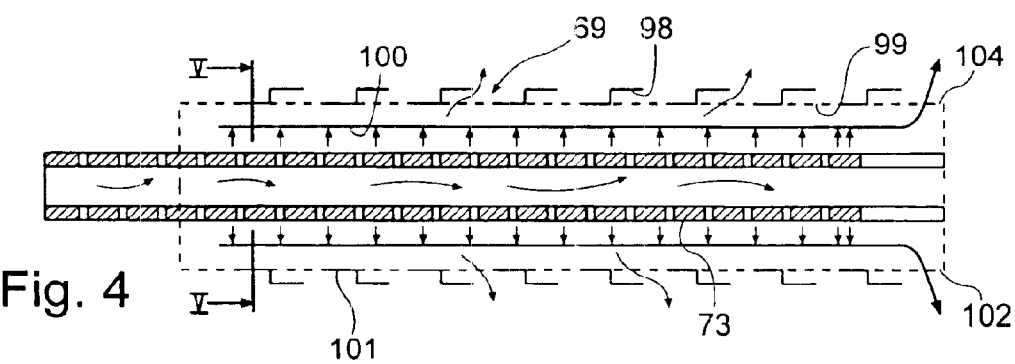
FIG. 4 is an isolated view of the filter housing used in the filtration vessel of the invention.
Figure 5:
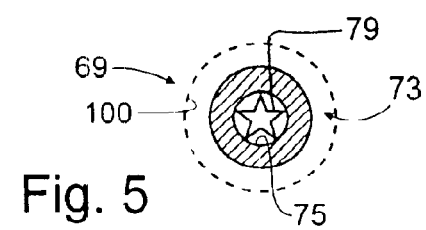
FIG. 5 is a cross sectional view taken along lines V—V in FIG. 4.

As will be apparent from FIG. 6, one portion of the cylindrical sidewall of the down-comer pipe 53 is cut away about a portion of the circumference thereof to create a "step" 65. The natural gas, along with the small remaining solid and liquid contaminants will turn upwardly once the gas flow reaches the step 65 and will travel upwardly through the interior of the down-comer pipe 53 to a coalescer element region 67 located above the vortex knockout region 45 within the vessel housing. The coalescer region 67 includes a plurality of coalescer filter element housings 69 which are arranged in vertical fashion generally parallel to the axis 51 within an upper region 71 of the vessel housing. The element housings 69 are mounted on a tube sheet 70 which separates the upper and lower regions of the vessel housing. The remaining contaminants in the gas stream entering the coalescer element housings 69 include small solid particles and liquid aerosols that were too small to be affected by the centrifugal forces imposed by the vortex knockout device. As seen in FIGS. 2, 4, and 5, each coalescer filter element housing (indicated generally as 69 in FIG. 4) includes a porous filter element 73 which is a coalescing/gravity drainage tube. As will be explained with respect to FIG. 2, in one embodiment of the invention on the discharge side of the compressor, the coalescer elements 73 are cored elements without internal pleats. In another embodiment of the invention where the elements are used on the suction side of the compressor, the porous coalescer elements 73 are coreless element having a central bore 75 within internal sidewalls, the internal sidewalls having pleats (one pleat 79 shown in FIG. 5). The pleats (79 in FIG. 5) remove any entrained solids and gases passing through the element 73.

In the most preferred form, the filter elements 73 are "PEACH®" elements commercially available from Perry Equipment Corporation of Mineral Wells, Tex. The filter elements are comprised of non-woven fabric. The fabric is preferably made up of a substantially homogenous mixture of a base fiber and binder material which is heated and compressed to form a first non-woven fabric strip of selected porosity. The first non-woven fabric strip is spirally wound upon itself in multiple overlapping layers (81, 83, 85 and 87 in FIG. 2) to form a first band having a selected radial thickness. A second, similar non-woven fabric strip of selected porosity which generally differs from the porosity of the first fabric strip is spirally wound upon itself in multiple overlapping layers to form a second band having a selected radial thickness. The first and second bands are overlapped and bonded together to form the porous, self supporting filter element 73. The various bands 89, 91, 93 and 95 are shown in FIG. 2.

The porous filter elements and method of manufacture are described in U.S. Pat. No. 5,827,430, issued Oct. 27, 1998, to Perry, Jr., et al., and assigned to the assignee of the present invention.

Each porous filter element 73 is housed within a rigid, vertical housing (69 in FIG. 4). Each rigid, vertical housing 69 is metal cylinder having a length "1" and an internal diameter 99 for receiving a porous coalescer element. The metal cylinder walls 101 are provided with louvered openings or holes 98 along the entire length thereof, whereby each of the coalescer housing acts a gas flow conditioner by stabilizing the gas flow around the coalescer elements contained therein. The louverred holes provided along the length of each element housing provide a slight back pressure on fluid exiting the coalescer elements, thereby resulting in a more uniform gas flow. The gas flow is illustrated by the arrows in FIG. 4. The housing is described in greater detail in U.S. Pat. No. 6,168,647, issued Jan. 2, 2001, and assigned to the assignee of the present invention. The housings are commercially available from Perry Equipment Corporation of Mineral Wells, Tex., as "louvered flow baffles."

The gas flow through the coalescer element region 67 is from the inside of the porous element 73 outwardly. The inside filter element layer traps solid particles and keeps them away from the coalescing matrix. The coalescing matrix of the porous media will coalesce and gravity drain the remaining liquid mist and aerosols from the gas stream. The entire gas stream flows along the hollow core of the porous elements, then through the coalescing media wall and into the area of clearance (100 in FIG. 5). Some portion of the gas stream flows through the annular louvers 98 with the remainder of the stream traveling along the area of clearance 100 and exiting the louvered element housing through slots 102 in the cap portion 104. Liquid droplets that are expelled into the area of clearance 100 provide a liquid scrubbing mechanism to collect micro fine liquid droplets entrained in the gas stream.

Figure 7:
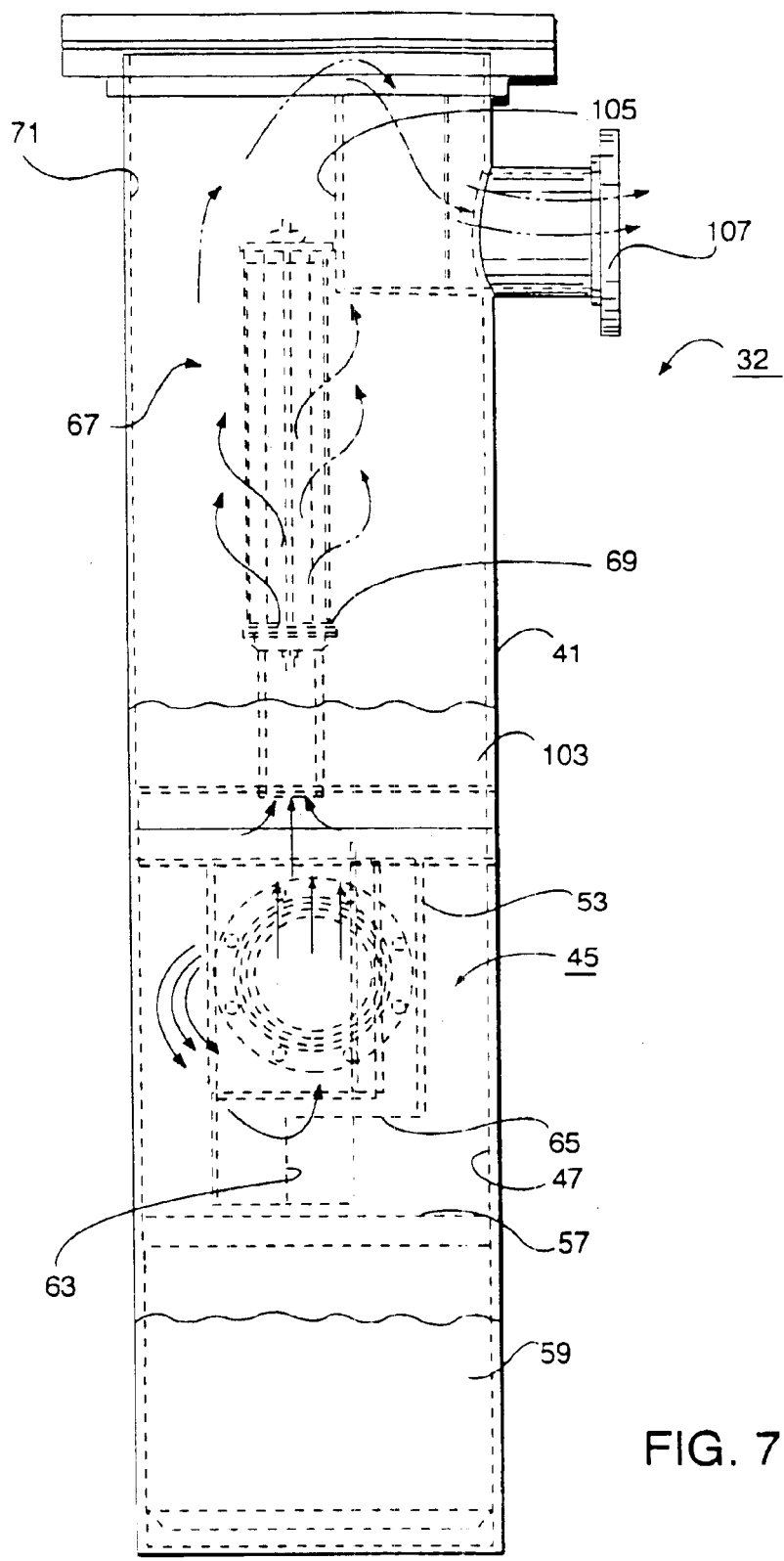
FIG. 7 is a right hand side, cross sectional view of the vessel of FIG. 6.

The louvered element housing 69 is a multi-functional device. It acts as a support and sealing mechanism for the porous element 73. It also allows the use of a coreless element tube in certain applications (as on the suction side of the compressor), thereby reducing the cost of the replacement element. As has been explained, it also works as a flow distribution device since the louvered holes provide a small amount of back pressure on the element forcing gas to flow more evenly throughout the entire length of the tube. The liquid mist and aerosols that are removed from the gas stream by the elements and louvered element housing are gravity drained to an upper or second stage liquid storage sump 103 (FIG. 6). Lube oil is continuously siphoned from this area back to the suction side of the compressor 11. The clean gas which leaves the louvered element housings 69 travels to the top of the vessel and flows over the outlet nozzle baffle 105 before exiting the discharge outlet (107 in FIG. 7). The outlet nozzle baffle 105 helps to pull gas evenly from each of the elements, thereby reducing gas flow channeling and carry over.

The louvered element housing 69 also works as a secondary liquid collection surface when the unit is under upset flow conditions. When liquid flow rates larger than the design capacity of the unit enter the vessel, the elements will quickly release coalesed liquid as a spray. The outer layer of the louvered element housings 69 will catch and gravity drain many of these liquids that would otherwise escape the vessel as carry over under upset conditions.

Figure 3:
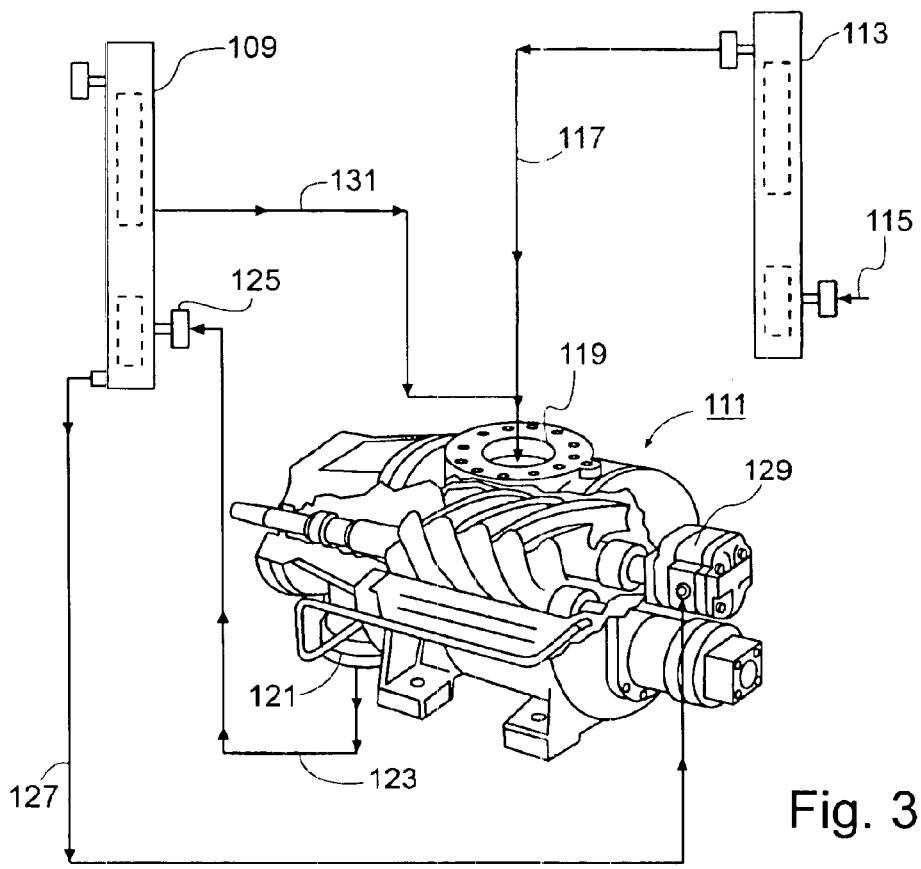
FIG. 3 is a simplified, schematic view of a screw compressor illustrating the operation of the two stages of the filtration vessel of the invention.

FIG. 3 is a simplified schematic showing the arrangement of two of the filtration vessels of the invention. In the compression process shown in FIG. 3, a filtration unit 109 is located on the discharge side of the screw compressor 111 while another unit 113 is located on the compressor suction side. As has been mentioned, the filter elements in the filtration unit used on the suction side of the compressor 111 are coreless elements, while the filter elements used on the discharge side of the compressor 111 are cored, due to the higher pressures involved. Both are commercially available "PEACH®" elements, as previously described. In the compression process shown in FIG. 3, raw suction gas enters the inlet 115 is filtered by the unit 113 and passes out the compressor suction line 117 to the suction flange 119 of the compressor 111. The high pressure gas/oil mixture is discharged from the discharge flange 121 and passes through conduit 123 to the inlet 125 of the vertical knockout coalescer unit 109. The collected liquid in the bottom sump of the unit 109 is recirculated through the conduit 127 to the rotor driven oil pump 129 of the compressor. The siphon drain from the upper sump of the unit 109 is discharged through the conduit 131 and joins the compressor suction line 117 entering the suction flange 119.

While the preferred system of the invention has the units arranged as described above, it will be understood that, in some applications, the position of the units may be reversed. In other words, the position of units 109 and 13 might be reversed, or only one unit might be used on either side of the compressor. One example of the placement of the unit 113 on the suction side of the compressor would be where the inlet stream to the compressor has or potentially has a very high liquid loading.

In such an arrangement, an upstream filtration vessel would keep the screw compressor clean. A unit such as the described unit 109 could be used as a downstream filtration vessel to remove the lube oil from the gaseous compressor discharge.

An invention has been provided with several advantages. Liquid separation has presented extensive problems in the natural gas compressor industry as well as in transmission lines and receiving points. The present device can be utilized where bulk separation is required with high efficiency levels. Once bulk liquid separation is achieved in the first stage filtration, further separation efficiency is enhanced in the specially designed coalescing filter element section of the device. In a typical operation, a thirty inch diameter vertical coalescer unit of the present design can be utilized to reclaim up to about 100 GPM of lube oil from compressor gas discharge. The addition of the vortex knock out device allows an increase of liquid flow rate handling capacity of 240 times more when compared to the same size standard coalescer vessel. The units of the invention are also simple in design and economical to manufacture. The small relative size allows the overall height of most units to be under 10 feet. This dimension is critical in allowing for the unit to be transported on interstate highways on a "skid" in the installed turnkey position. Other separation devices would typically require an overall vessel height of 15 or more feet for a similar sized unit. The unit of the invention utilizes basic principals of velocity, gravity and impingement to assure that maximum liquid removal efficiency can be achieved without the use of multiple removal vessels.

While the invention has been shown in only one of its forms, it is not thus limited, but is susceptible to various changes and modifications without the departing from the spirit thereof.

What is claimed is:

1. A filtration vessel for use with a rotary screw compressor which receives a compressed liquid/gas mixture from the compressor and which creates an essentially liquid free flow leaving the compressor, the vessel comprising:

a vertically arranged vessel housing having an inlet;

a vortex knock out region located within a lower region of the vessel housing and communicating with the vessel inlet, the vortex knock out region utilizing uniform circular motion to impose a centrifugal force on gas and liquid fluids entering the vessel housing, the centrifugal force acting to separate relatively heavier fluids from relatively lighter fluids;

a vertically arranged down-comer pipe centrally located within the vessel housing;

a coalescer element region located above the vortex knock out region within the vessel housing containing a plurality of coalescer filter elements and communicating with the vortex knock out region by means of the down-comer pipe for receiving the relatively lighter fluids separated in the vortex knock out region and for separating any entrained liquids remaining in the fluids;

an outlet from the vessel housing for receiving and discharging the filtered fluids;

wherein the coalescer filter elements each comprise a porous media, each element being housed within a rigid, vertical housing; and wherein each rigid, vertical housing is a metal cylinder having a length and an internal diameter for receiving a porous coalescer element, the metal cylinders having louvered openings along the entire lengths thereof, whereby each of the coalescer element housings act as a gas flow conditioner by stabilizing the gas flow around the coalescer element contained therein.

2. The filtration vessel of claim 1, wherein the louvered openings provided along the length of each coalescer element housing provide a slight back pressure on fluid exiting the coalescer elements, thereby resulting in a more uniform gas flow.

3. A filtration vessel for use with a rotary screw compressor which receives a compressed liquid/gas mixture from the compressor and which creates an essentially liquid free flow leaving the compressor, the vessel comprising:

a vertically arranged vessel housing having an inlet;

a vortex knock out region located within a lower region of the vessel housing and communicating with the vessel inlet, the vortex knock out region utilizing uniform circular motion to impose a centrifugal force on gas and liquid fluids entering the vessel housing, the centrifugal force acting to separate relatively heavier fluids from relatively lighter fluids;

a vertically arranged down-comer pipe centrally located within the vessel housing;

a coalescer element region located above the vortex knock out region within the vessel housing containing a plurality of coalescer filter elements and communicating with the vortex knock out region by means of the down-comer pipe for receiving the relatively lighter fluids separated in the vortex knock out region and for separating any entrained liquids remaining in the fluids;

an outlet from the vessel housing for receiving and discharging the filtered fluids;

wherein the coalescer filter elements each comprise a porous media, each element being housed within a rigid, vertical housing; and wherein the porous coalescer elements are coreless elements having a central bore with internal sidewalls, the internal sidewalls being pleated to remove any entrained solids in the fluids passing through the elements.

4. A filtration vessel for use with a rotary screw compressor which receives a compressed liquid/gas mixture from the compressor and which creates an essentially liquid free flow leaving the compressor, the vessel comprising:

a vertically arranged vessel housing having an inlet;

a vortex knock out region located within a lower region of the vessel housing and communicating with the vessel inlet, the vortex knock out region utilizing uniform circular motion to impose a centrifugal force on gas and liquid fluids entering the vessel housing, the centrifugal force acting to separate relatively heavier fluids from relatively lighter fluids;

a vertically arranged down-comer pipe centrally located within the vessel housing;

a coalescer element region located above the vortex knock out region within the vessel housing containing a plurality of coalescer filter elements and communicating with the vortex knock out region by means of the down-comer pipe for receiving the relatively lighter fluids separated in the vortex knock out region and for separating any entrained liquids remaining in the fluids;

an outlet from the vessel housing for receiving and discharging the filtered fluids;

wherein the coalescer filter elements each comprise a porous media, each element being housed within a rigid, vertical housing; and wherein the porous coalescer elements are solid, cored elements.

5. A filtration vessel for use with a rotary screw compressor which receives a compressed liquid/gas mixture from the compressor and which creates an essentially liquid free flow leaving the compressor, the vessel comprising:

a vertically arranged vessel housing having an inlet;

a vortex knock out region located within a lower region of the vessel housing and communicating with the vessel inlet, the vortex knock out region utilizing uniform circular motion to impose a centrifugal force on gas and liquid fluids entering the vessel housing, the centrifugal force acting to separate relatively heavier fluids from relatively lighter fluids;

a vertically arranged down-comer pine centrally located within the vessel housing;

a coalescer element region located above the vortex knock out region within the vessel housing containing a plurality of coalescer filter elements and communicating with the vortex knock out region by means of the down-comer pipe for receiving the relatively lighter fluids separated in the vortex knock out region and for separating any entrained liquids remaining in the fluids;

an outlet from the vessel housing for receiving and discharging the filtered fluids;

wherein the coalescer filter elements each comprise a porous media, each element being housed within a rigid, vertical housing; and wherein the filter elements are comprised of non-woven fabric, the fabric being made up of a substantially homogeneous mixture of a base fiber and a binder material compressed to form a first nonwoven fabric strip of selected porosity, the first nonwoven fabric strip being spirally wound upon itself in multiple overlapping layers to form a first band having a selected radial thickness, a second, similar nonwoven fabric strip of selected porosity which differs from the porosity of the first fabric strip being spirally wound being upon itself in multiple overlapping layers to form a second band having a selected radial thickness, the first and second bands being overlapped and bonded together to form the porous, self-supporting filter element.

6. A compression process for fluids, the process comprising the steps of:

receiving a low pressure gas stream into a rotary screw compressor;

compressing the low pressure gas stream with the rotary screw compressor while lubricating the compressor with a lube oil to thereby create a compressed gas/oil mixture;

separating the compressed gas/oil mixture by first dropping out bulk liquids in a first filtration step conducted in a filtration vessel which utilizes a vortex knock out means utilizing uniform circular motion to impose a centrifugal force on the gas/oil mixture entering the vessel, the centrifugal force acting to separate relatively heavier lube oil from relatively lighter gas constituents of the mixture to produce a compressed gas having entrained liquids;

thereafter, subjecting the compressed gas having entrained liquids to a second filtration step in the same filtration vessel by passing the compressed gas through a plurality of coalescing filter elements;

recirculating the separated lube oil back to the rotary screw compressor;

discharging the compressed gas from the filtration vessel;

wherein the filtration vessel is provided with a housing having generally cylindrical interior sidewalls and wherein a down-comer pipe communicates the vortex knock out means and the coalescing filter elements, the down-comer pipe having a generally cylindrical exterior and being located generally alone a vertical centerline of the vessel housing, the cylindrical sidewalls of the vessel housing and the exterior of the down-comer pipe serving to create the centrifugal force which is exerted on the gas/oil mixture entering the vessel housing;

wherein the coalescer filter elements each comprise a porous media, each element being housed within a rigid, vertical housing; and wherein each rigid, vertical housing is provided in the form of a metal cylinder having a length and an internal diameter for receiving a porous coalescer element, the metal cylinders having louvered openings along the entire lengths thereof, whereby each of the coalescer element housings act as a gas flow conditioner by stabilizing the gas flow around the coalescer element contained therein.

7. The method of claim 6, further comprising the steps of providing louvered openings along the length of each coalescer element housing, the openings serving to provide a slight back pressure on gas exiting the coalescer elements, thereby resulting in a more uniform gas flow.

8. The method of claim 7, wherein the porous coalescer elements which are used in the method are provided in the form of coreless elements having a central bore with internal sidewalls, the internal sidewalls being pleated to remove any entrained solids in the fluids passing through the elements.

9. The method of claim 7, wherein the porous coalescer elements which are used in the method are provided in the form of solid, cored elements.

10. The method of claim 7, wherein the filter elements which are used in the method are comprised of non-woven fabric, the fabric being made up of a substantially homogeneous mixture of a base fiber and a binder material compressed to form a first nonwoven fabric strip of selected porosity, the first nonwoven fabric strip being spirally wound upon itself in multiple overlapping layers to form a first band having a selected radial thickness, a second, similar nonwoven fabric strip of selected porosity which differs from the porosity of the first fabric strip being spirally wound being upon itself in multiple overlapping layers to form a second band having a selected radial thickness, the first and second bands being overlapped and bonded together to form the porous, self-supporting filter element.

11. A compressor system for use with fluid flows to create essentially liquid-free flows, the system comprising:

a rotary screw compressor, including:

(a) an inlet port for receiving a low pressure gas stream;

(b) a main lubrication injection port for receiving a lube oil lubrication stream;

(c) a prime mover for powering the rotary screw compressor; and (d) a discharge port for discharging a high pressure compressed gas/oil mixture from the compressor;

a filtration vessel for receiving the compressed gas/oil mixture from the compressor, the vessel comprising:
(i) a vertically arranged vessel housing having an inlet;
(ii) a vortex knock out region located within a lower region of the vessel housing and communicating with the vessel inlet, the vortex knock out region utilizing uniform circular motion to impose a centrifugal force on gas/oil mixture entering the vessel housing, the centrifugal force acting to separate a relatively heavier lube oil constituent from relatively lighter gas constituent;
(iii) a vertically arranged down-comer pipe centrally located within the vessel housing;
(iv) a coalescer element region located above the vortex knock out region within the vessel housing containing a plurality of coalescer filter elements and communicating with the vortex knock out region by means of the down-comer pipe for receiving the relatively lighter gas constituent separated in the vortex knock out region and for separating any entrained liquids remaining in the relatively lighter constituent;
(v) an outlet from the vessel housing for receiving and discharging filtered compressed gas;
(vi) a conduit connecting the lower region of the vessel housing with the lube oil compression stream of the compressor for recirculating the separated lube oil back to the rotary screw compressor; and
wherein the inlet port for receiving a low pressure gas stream is connected to a source of natural gas.

12. A compressor system for use with fluid flows to create essentially liquid-free flows, the stem comprising;
a rotary screw compressor, including:
(a) an inlet port for receiving a low pressure gas stream;
(b) a main lubrication injection port for receiving a lube oil lubrication stream;
(c) a prime mover for powering the rotary screw compressor; and
(d) a discharge port for discharging a high pressure compressed gas/oil mixture from the compressor;
a filtration vessel for receiving the compressed gas/oil mixture from the compressor, the vessel comprising:
(i) a vertically arranged vessel housing having an inlet;
(ii) a vortex knock out region located within a lower region of the vessel housing and communicating with the vessel inlet, the vortex knock out region utilizing uniform circular motion to impose a centrifugal force on gas/oil mixture entering the vessel housing, the centrifugal force acting to separate a relatively heavier lube oil constituent from relatively lighter gas constituent;
(iii) a vertically arranged down-comer pipe centrally located within the vessel housing;
(iv) a coalescer element region located above the vortex knock out region within the vessel housing containing a plurality of coalescer filter elements and communicating with the vortex knock out region by means of the down-comer pipe for receiving the relatively lighter gas constituent separated in the vortex knock out region and for separating any entrained liquids remaining in the relatively lighter constituent;
(v) an outlet from the vessel housing for receiving and discharging filtered compressed gas;
(vi) a conduit connecting the lower region of the vessel housing with the lube oil compression stream of the compressor for recirculating the separated lube oil back to the rotary screw compressor; and
wherein a filtration vessel is located upstream of the rotary screw compressor in communication with the compressor inlet port on a suction side of the compressor; and
wherein the filtration vessel which is located upstream of the rotary screw compressor also has a first stage knock out vortex region and a second stage coalescer filter element region.

13. A filtration vessel for use on an inlet or suction side of a rotary screw compressor or other gas handling device, the vessel comprising:
a vertically arranged vessel housing having an inlet;
a vortex knock out region located within a lower region of the vessel housing and communicating with the vessel inlet, the vortex knock out region utilizing uniform circular motion to impose a centrifugal force on gas and liquid fluids entering the vessel housing, the centrifugal force acting to separate relatively heavier fluids from relatively lighter fluids;
a vertically arranged down-comer pipe centrally located within the vessel housing;
a coalescer element region located above the vortex knock out region within the vessel housing containing a plurality of coalescer filter elements and communicating with the vortex knock out region by means of the down-comer pipe for receiving the relatively lighter fluids separated in the vortex knock out region and for separating any entrained liquids remaining in the fluids;
an outlet from the vessel housing for receiving and discharging the filtered fluids;
wherein the coalescer filter elements each comprise a porous media, each element being housed within a rigid, vertical housing; and
wherein each rigid, vertical housing is a metal cylinder having a length and an internal diameter for receiving a porous coalescer element, the metal cylinders having louvered openings along the entire lengths thereof, whereby each of the coalescer element housings act as a gas flow conditioner by stabilizing the gas flow around the coalescer element contained therein.

14. The filtration vessel of claim 13, wherein the louvered openings provided along the length of each coalescer element housing provide a slight back pressure on fluid exiting the coalescer elements, thereby resulting in a more uniform gas flow.

15. A filtration vessel for use on an inlet or suction side of a rotary screw compressor or other gas handling device, the vessel comprising:
a vertically arranged vessel housing having an inlet;
a vortex knock out region located within a lower region of the vessel housing and communicating with the vessel inlet, the vortex knock out region utilizing uniform circular motion to impose a centrifugal force on gas and liquid fluids entering the vessel housing, the centrifugal force acting to separate relatively heavier fluids from relatively lighter fluids;
a vertically arranged down-comer pipe centrally located within the vessel housing;
a coalescer element region located above the vortex knock out region within the vessel housing containing a plurality of coalescer filter elements and communicating with the vortex knock out region by means of the down-comer pipe for receiving the relatively lighter fluids separated in the vortex knock out region and for separating any entrained liquids remaining in the fluids;

an outlet from the vessel housing for receiving and discharging the filtered fluids;

wherein the coalescer filter elements each comprise a porous media, each element being housed within a rigid, vertical housing; and wherein the porous coalescer elements are careless elements having a central bore with internal sidewalls, the internal sidewalls being pleated to remove any entrained solids in the fluids passing through the elements.

16. A filtration vessel for use on an inlet or suction side of a rotary screw compressor or other gas handling device, the vessel comprising:

a vertically arranged vessel housing having an inlet;

a vortex knock out region located within a lower region of the vessel housing and communicating with the vessel inlet, the vortex knock out region utilizing uniform circular motion to impose a centrifugal force on gas and liquid fluids entering the vessel housing, the centrifugal force acting to separate relatively heavier fluids from relatively lighter fluids;

a vertically arranged down-comer pipe centrally located within the vessel housing;

a coalescer element region located above the vortex knock out region within the vessel housing containing a plurality of coalescer filter elements and communicating with the vortex knock out region by means of the down-comer pipe for receiving the relatively lighter fluids separated in the vortex knock out region and for separating any entrained liquids remaining in the fluids;

an outlet from the vessel housing for receiving and discharging the filtered fluids;

wherein the coalescer filter elements each comprise a porous media, each element being housed within a rigid, vertical housing; and wherein the porous coalescer elements are solid, cored elements.

\* \* \* \* \*